United States Patent [19]

Rogers et al.

[11] Patent Number: 5,915,256
[45] Date of Patent: Jun. 22, 1999

[54] MULTIMEDIA METHOD AND APPARATUS FOR PRESENTING A STORY USING A BIMODAL SPINE

[75] Inventors: Michael Alan Rogers, Oakland, Calif.; Peter McGrath, Pelham Manor, N.Y.; Robert Ogdon, Littleton, Colo.

[73] Assignee: Newsweek, Inc., New York, N.Y.

[21] Appl. No.: 08/968,886

[22] Filed: Nov. 5, 1997

Related U.S. Application Data

[63] Continuation of application No. 08/575,447, Dec. 20, 1995, abandoned, which is a continuation of application No. 08/199,378, Feb. 18, 1994, abandoned.

[51] Int. Cl.$^6$ .................................................. G06F 15/00
[52] U.S. Cl. .......................................... 707/501; 345/302
[58] Field of Search ............................. 707/501; 345/302

[56] References Cited

U.S. PATENT DOCUMENTS

| | | | |
|---|---|---|---|
| 5,109,482 | 4/1992 | Bohrman | 395/154 |
| 5,241,671 | 8/1993 | Reed et al. | 395/600 |

FOREIGN PATENT DOCUMENTS

WO 93/03453   2/1993   WIPO .

OTHER PUBLICATIONS

Raper et al., "The development of a hypertext–based tutor for geographical information systems", *British Journal of Educational Technology*, v. 20, n. 3, 1989, pp. 164–172.
Nordgren, "Just Grandma and Me", *CD–ROM Professional*, Nov. 1993, pp. 180–181.
Mullerburg et al., "The METKIT CAI system at the age of one", *Eurometrics '92: European Conference on Quantitative Evaluation of Software and Systems*, Apr. 13, 1992, pp. 115–124.
Warner New Media, Desert storm: The War in the Persian Gulf, 1991.
Metatec Corporation, Nautilus CD–ROM, 1992.
Woolsey, "Multimedia Scouting", IEEE Computer Graphics & Applications, pp. 26–38, Jul. 1991.
"Seybold San Francisco '92: A Progress Report", *Seybold Report on Desktop Publishing*, v. 7, n. 3, p. 1, Nov. 2, 1992.
Boisseau, "The Bard of CD–ROM", *Houston Chronicle*, pp. 4A–4B, Oct. 5, 1992.
"Interactive Movie Takes Top Honors at QuickTime Film Festival", News Release by HyperBole Studios, Jun. 3, 1992.

*Primary Examiner*—Joseph R. Burwell
*Attorney, Agent, or Firm*—Weil, Gotshal & Manges, LLP

[57] ABSTRACT

A multimedia method and apparatus for presenting to a user a story using a bimodal spine is disclosed. The first mode is substantially passive and relates the story in a narrative presentation of synchronized audio and image information. The second mode is substantially interactive and relates the story in text or in text and associated image information. The script used for the audio presentation is identical to the script used for the text presentation. The system permits the user to freely transfer between the two modes while maintaining narrative continuity between the modes, and it also allows the activation of hypertext features from either mode. The system provides for enhanced features, including a library function, an "Interactive Poll" feature, a "Face-to-Face" interview feature, and sponsor advertising.

24 Claims, 12 Drawing Sheets

MULTIMEDIA METHOD AND APPARATUS FOR PRESENTING A STORY USING A BIMODAL SPINE

This application is a continuation of application Ser. No. 08/575,447 filed on Dec. 20, 1995, abandoned, which is a continuation of Ser. No. 08/199378, filed Feb. 18, 1994, abandoned.

BACKGROUND OF THE INVENTION

1. Field of the Invention

The present invention relates generally to the presentation of information using interactive digital technology, and particularly, to a multimedia method and apparatus for presenting a story using a bimodal spine.

2. Description of the Prior Art

The digital information age presents opportunities for combining complex combinations of audio, image and text data in previously unknown ways. Existing technology permits a user to access such multimedia data interactively and in nonlinear order. An important factor in development and improvement in this field is the creative use of digital media formats.

Present forms of digital media allow the storage of large quantities of information and permit rapid access to such information in nonlinear order. One such form of new media is the compact disc, which is capable of storing vast quantities of audio, image and text data. The first widespread consumer use of the compact disc format involved the storage of music information for reproduction on home and personal stereo equipment. Critics praised audio compact discs for their fidelity, durability and convenience. In particular, the compact disc offered a significant improvement over vinyl records and magnetic cassettes, which fail to provide rapid access to noncontiguous musical selections.

More recently, with improvements in computer technology, the compact disc has moved to other consumer electronic environments, such as home computers and dedicated multimedia systems. In these broader environments, the compact disc stores audio, image and text data, and it is referred to as CD-ROM, an acronym for "compact disc read only memory." This acronym reflects the present limitation of the format in not providing writing capabilities, which future developments are likely to make available. Because CD-ROM offers a standard format for storing entertainment data, many products are being produced to uniquely exploit the qualities of this medium. Hardware manufacturers, such as Philips, Sega and Sony, have created devices dedicated to CD-ROM applications for the consumer electronics market.

In addition to CD-ROM, developments in computer networks have furthered the accessibility of digital information in previously unknown ways. As a result of exponential improvements in the propagation of electronic data, means are available for effectively interacting with digital media stored on remote databases. As the speed of electronic networks improves, software presently stored on CD-ROM will be available to wide audiences through computer networks. The increasing availability of means to access combinations of audio, image and text data underlies the present invention. Use of a particular storage media—CD-ROM form for standalone use, network form for online use, or some other form—is not essential to implementing the present invention.

Although there is great potential in multimedia technologies, there are at present many limitations, particularly in the software that enables the technology and in the interactive interfaces. Thus, the goal of the present invention is to address the need for multimedia software to accommodate varying levels of user interactivity. A first group of users prefers an interactive role in the presentation of a story, article or other thematic collection of data. These users seek to control their own progression through the story by interactively directing the computer means which presents the story, much like reading a magazine. A second group of users enjoys a passive presentation, more like television. These users seek to limit their interface with the computer means and have the computer means itself tell the story. Still a third group of users prefers a combination of both types of presentation. At times, they seek interactive participation in the process; at other times, they want to relax and passively watch the presentation.

Prior art multimedia software does not sufficiently accommodate the needs of these three disparate user groups. For example, Nautilus' interpretation of an interactive magazine adopts the metaphor of a computer bulletin board, in which a user selects different data elements for individual presentation. Similarly, in Warner New Media's "Desert Storm: The War in the Persian Gulf," a user individually selects and reviews audio, image and text data related to a particular chapter topic. The "Desert Storm" product, however, separately presents audio, image and text data and does not provide an interrelated presentation of the data. Thus, the prior art fails to support a bimodal presentation, in which a user freely toggles between a passive mode and an interactive mode while maintaining narrative continuity between the modes.

Accordingly, it is the goal of the present invention to provide a method and apparatus for presenting a multimedia story using a bimodal spine. In the first mode, the user is presented with a narrative story using a synchronized sequence of audio and image information. In this "narrative" mode, the user is substantially passive, i.e., does not interact with the system. The narrative progresses in a sequential order, and although the user may interrupt the story to either jump to a different section of the story or access other information through hypertext features, the user does not need to control the story's presentation. In the second mode, or "exploration" mode, the user controls the flow of the story and interactively participates. He is presented with the same "script" as used in the audio narration of the story, but in text form. The user may also be presented with images corresponding to the text. The user controls the flow of the story by paging through the screens comprising the story and obtaining greater detail about the story through hypertext features. The present invention permits the user to freely toggle between these narrative and exploration modes while maintaining narrative continuity.

The present invention further improves on prior art by permitting access to hypertext features from either mode. The hypertext features allow the user to obtain greater detail about a particular topic within the presentation of the story. While hypertext features are available from either mode, hypertext features return control to the mode from which access was made and at the location at which control was transferred.

It is an additional improvement of the present invention to provide features to complement and expand on the underlying story-telling process. Such features include a library feature, an "Interactive Poll" feature, a "Face-to-Face" feature, and the inclusion of advertising. Further and additional complementary features are apparent from the present specification, such as a simulation feature allowing the user to execute a simulation based on an underlying story, a game feature allowing the user to execute a game based on an underlying story, and numerous other features.

SUMMARY OF THE INVENTION

The present invention teaches a method and apparatus for presenting a story in a multimedia format using a bimodal spine, wherein the first mode is substantially passive and the second mode is substantially interactive. The first mode relates the story in a narrative presentation of synchronized audio and image information. The second mode relates the story in text, but may also include associated image information. The script used for the audio presentation is identical to the script used for the text presentation. The system further permits the user to freely transfer between the two modes and also allows the activation of hypertext features from either mode. A pointer to the data comprising each mode maintains narrative continuity between the two modes.

The present invention further provides additional features such as a library means for direct access to the audio, image and text information stored on the digital media element. Such information may or may not comprise discrete elements of the story. The information to which library access is allowed includes text with hypertext links, text without hypertext links, audio, still images, moving images, moving images with synchronized audio, and interactive branches. Further and additional features are provided, such as an "Interactive Poll" feature, a "Face-to-Face" interview feature, and sponsor advertising.

BRIEF DESCRIPTION OF THE DRAWING

The foregoing advantages of the present invention are apparent from the following detailed description of the preferred embodiment of the invention with reference to the drawings, in which.

PREFERRED EMBODIMENT OF THE INVENTION

1. System for Using the Present Invention

Figure 1:
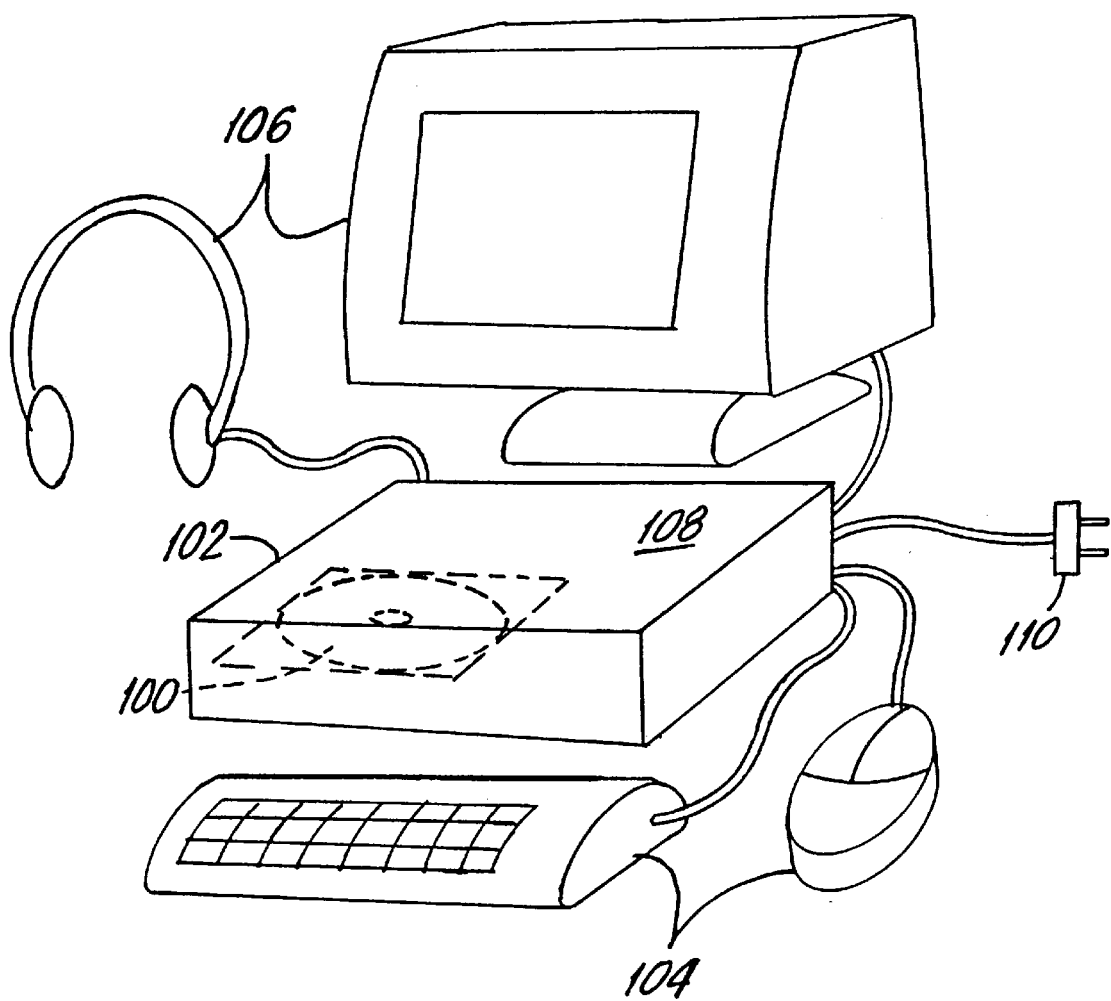
FIG. 1 shows the configuration of an apparatus to which the present invention applies.

FIG. 1 shows the configuration of an apparatus to which the present invention applies. The system comprises six elements. A digital media element 100, such as CD-ROM, provides a means for storing the digital multimedia program. A digital retrieval means 102 retrieves the digital multimedia program from the digital media element 100. An input device 104, such as a keyboard or mouse, permits a user to specify commands to the system. An output device 106, such as an LCD display and headphones, presents the user with audio, image and text output. A processing means 108 executes the process for presenting a story using a bimodal spine. A power source 110, such as alternating current, provides power to the electronic elements of the system.

2. The Top Level Menu and the Overall Process

Figure 2:
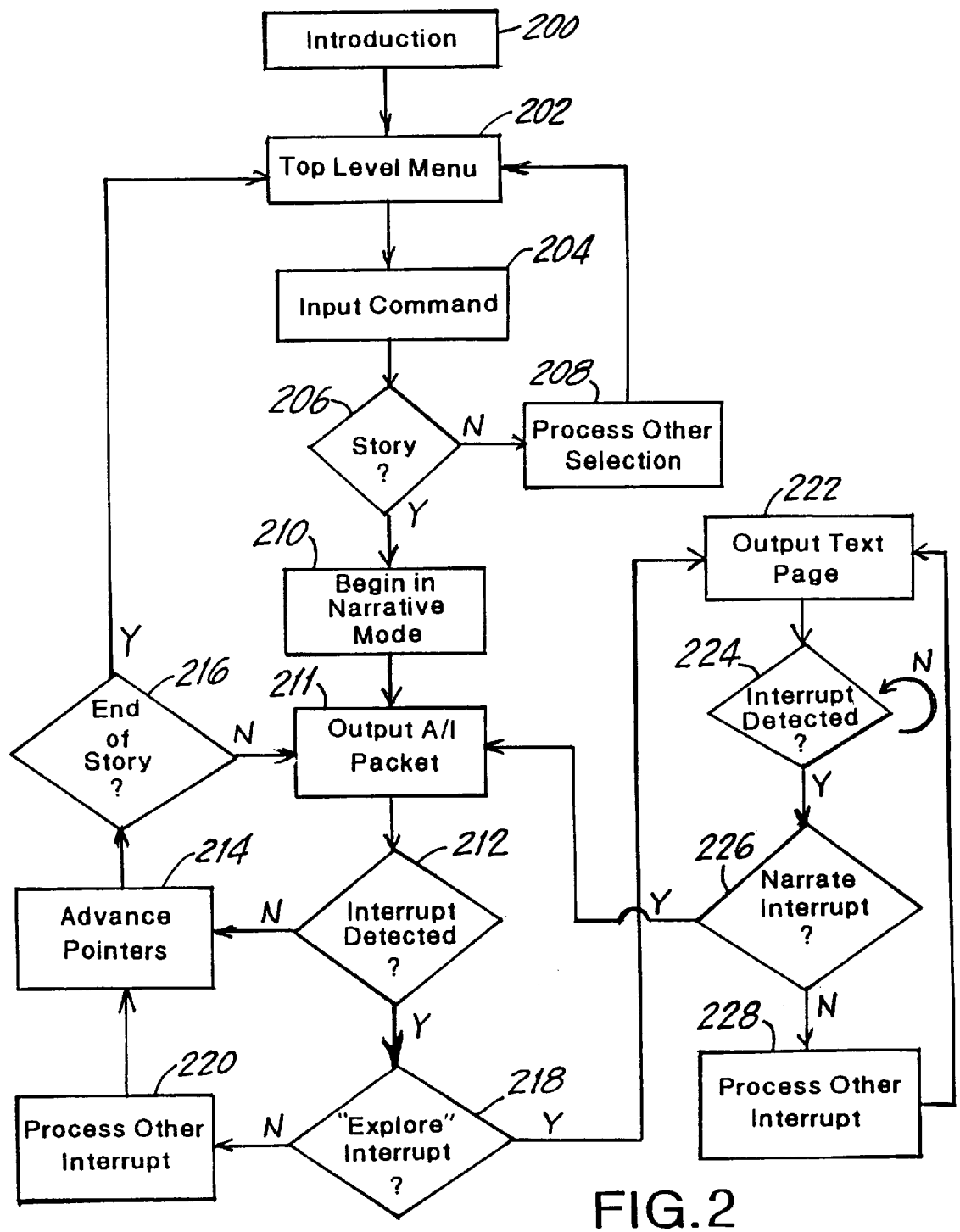
FIG. 2 shows a flow diagram of the process for presenting a story using a bimodal spine.
Figure 6:
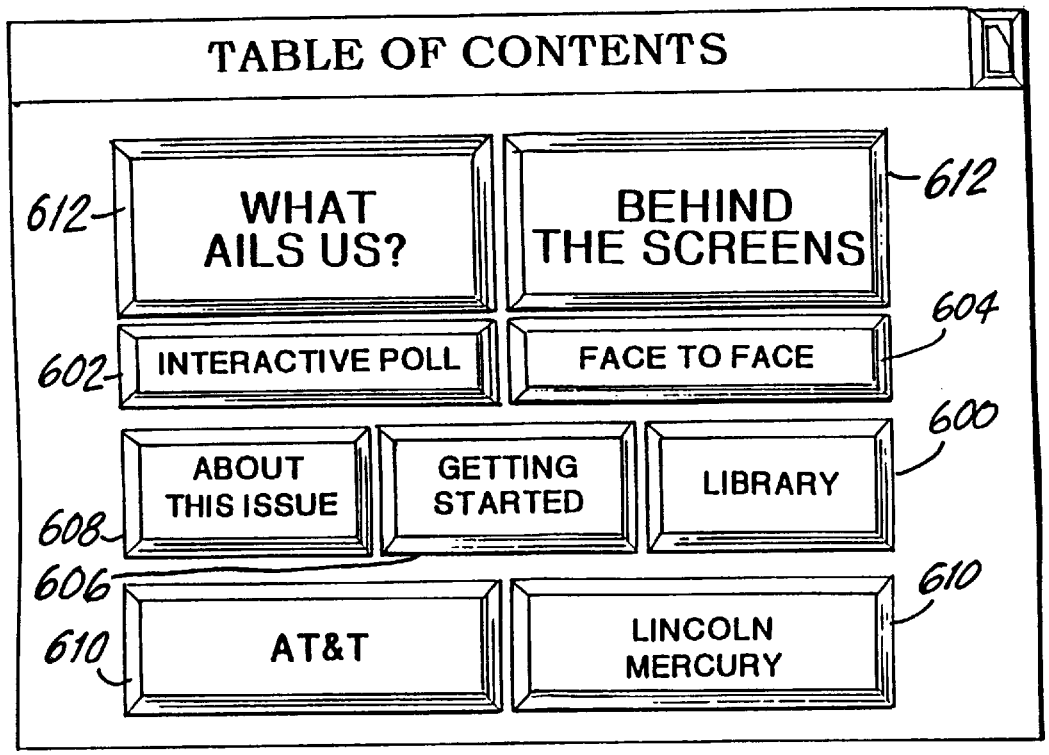
FIG. 6 shows the top level menu of the process.

FIG. 2 shows a flow diagram of the process for presenting a story using a bimodal spine. Step 200 introduces the user to the system and summarizes the one or more stories, or feature articles, contained on the digital media element 100. Step 202 presents the user with a top level menu of options. FIG. 6 shows the top level menu presented to the user.

Figure 17:
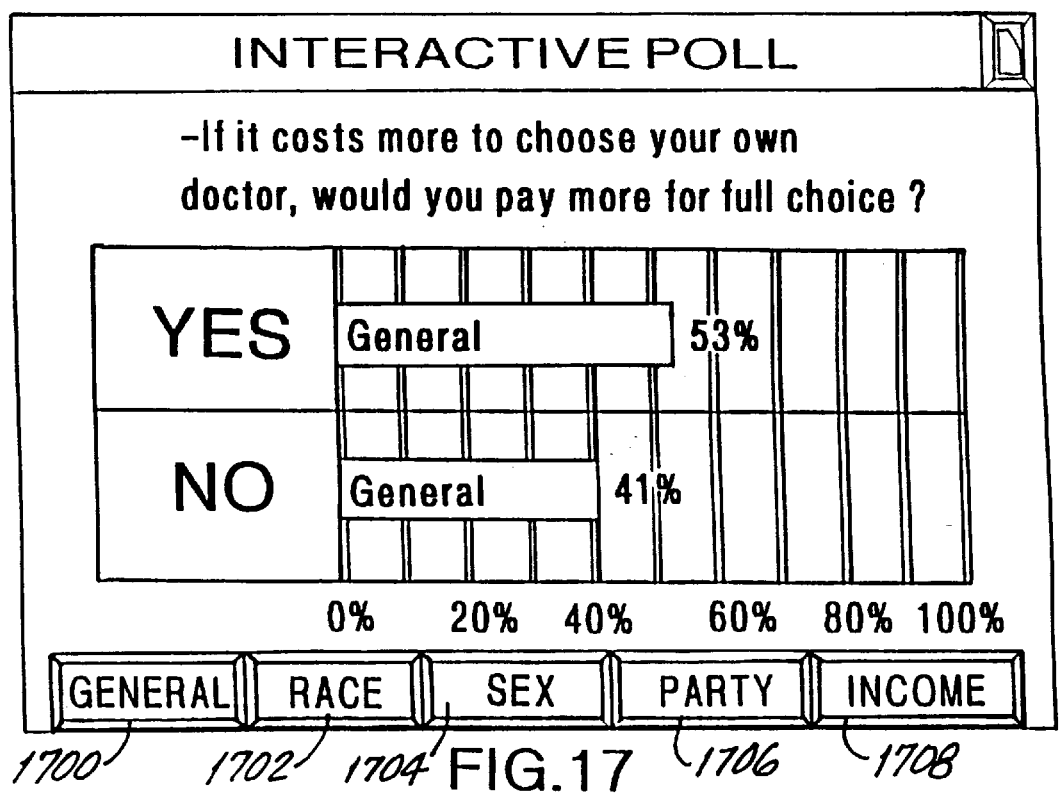
FIG. 17 shows a typical screen from the "Interactive Poll" feature.
Figure 18:
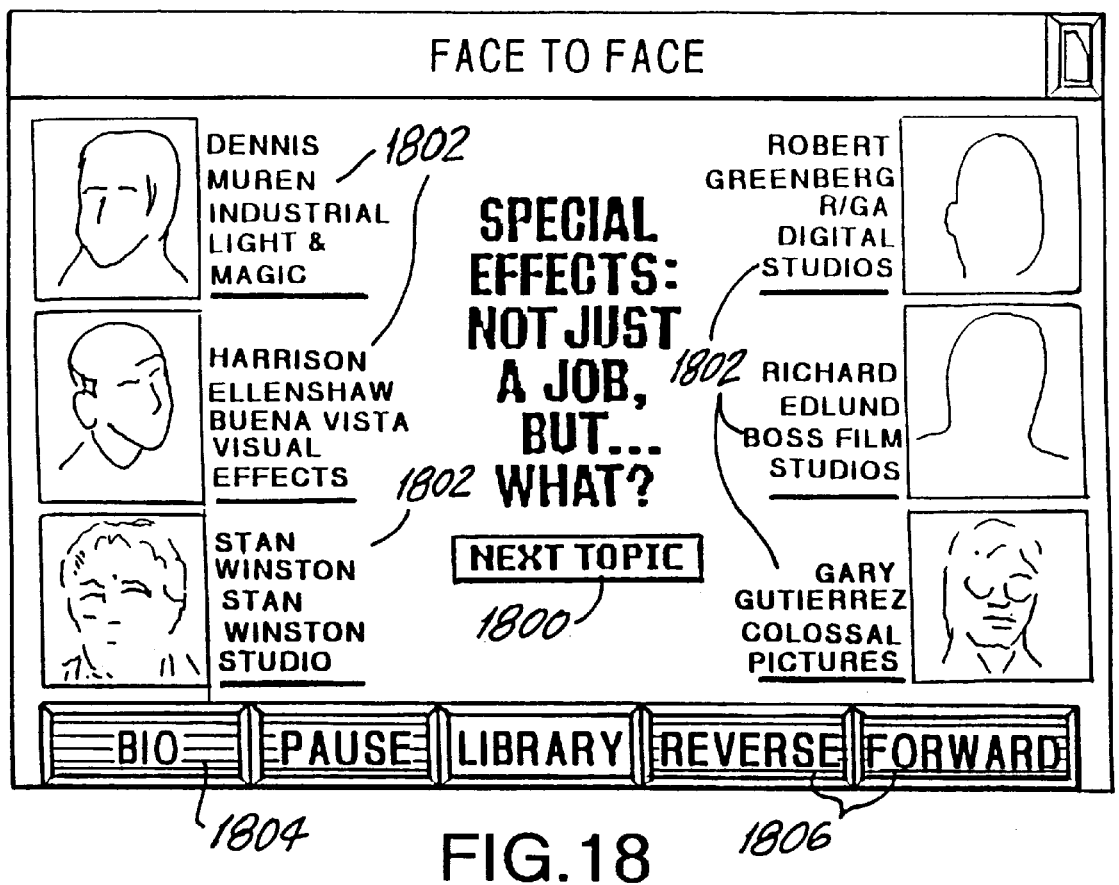
FIG. 18 shows a typical screen from the "Face-to-Face" feature.

In the preferred embodiment, six functions are supported in the top level menu. A library function 600 allows the user to directly access the various multimedia segments contained on the digital media element 100. The "Interactive Poll" feature 602 permits a user to actively assemble poll information based on various demographic classifications and to create graphic representations of the information. This feature is described in its own flow diagram in FIG. 4, and a typical screen from this feature is shown at FIG. 17. The "Face-to-Face" feature 604 permits a user to actively conduct an interview by selecting questions and selecting panelists to respond to the questions. This feature is described in its own diagram in FIG. 5, and a typical screen from this feature is shown at FIG. 18. The "Getting Started" feature 606 instructs a user on how to operate the system. The "About-This-Issue" feature 608 provides information about the contents of the present digital media element 100. Finally, advertisements 610 allow inclusion on the digital media element 100 of sponsor messages.

Returning to FIG. 2, step 204 inputs a command from the user. Step 206 determines whether the user selected a story 612. If so, program control transfers to step 210. If a story is not selected, program control transfers to step 208, which processes the selection other than a story by executing the item 600 through 610 selected. Step 208 returns program control to step 202.

3. Relating a Story in Narrative Mode

If program control transfers to step 210, the selected story 612 commences in narrative mode. A pointer to the stream of audio/image information comprising the narrative data as well as a pointer to the stream of text information comprising the exploration data are set to the beginning of the respective streams. Both pointers are initialized so that the user may freely toggle between the two modes during story telling.

Figure 7:
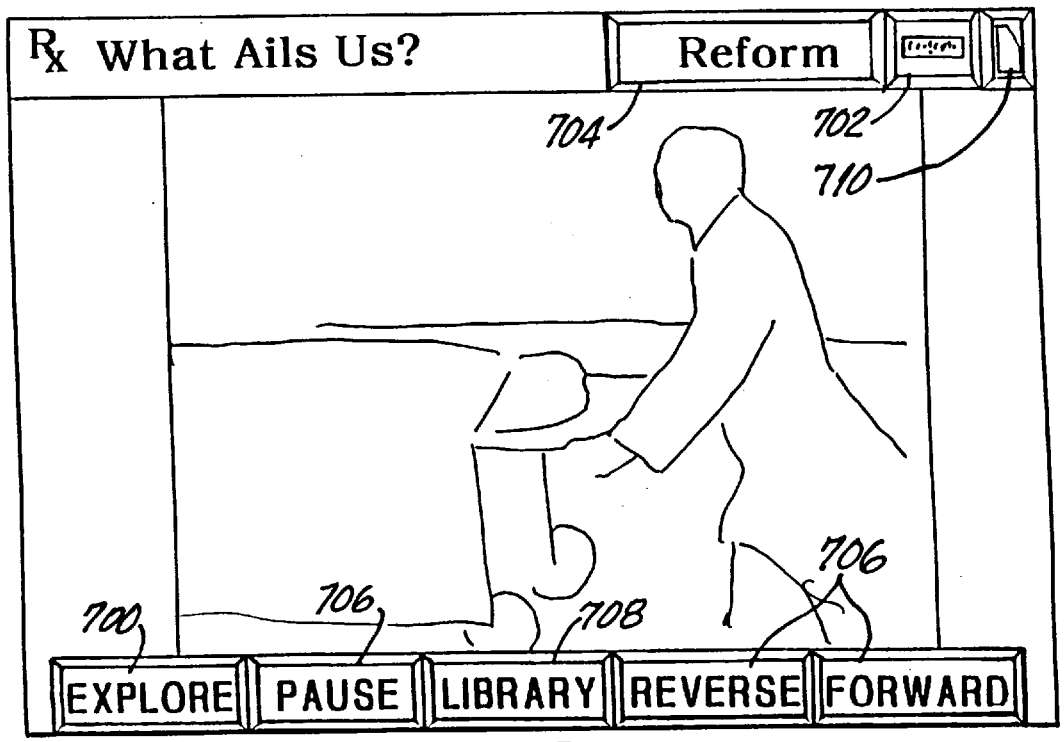
FIG. 7 shows a typical screen in the narrative mode.

Program control continues with step 211, which sends the currently pointed to packet of audio/image data to the output device 106. FIG. 7 shows a typical screen in narrative mode. Step 212 tests for an interrupt, which is a signal to the processing means 108 that the user has selected an available function. The user selects an available function through the input device 104. The preferred embodiment permits selection through a variety of means, including special function keys and the ability to highlight and click on control features visually displayed on the output device 106. Other forms of selection, such as through mouse or touchscreen control, are equally permissible and consistent with the principles embodied in the present invention.

If an interrupt is detected, program control transfers to step 218. If an interrupt is not detected, program control transfers to step 214. Step 214 advances the story. The pointer to the audio/image stream advances to the next packet of data in the stream. Also, if a pagebreak occurs in the audio script, the pointer to the text stream advances to the next page. Step 216 determines whether the pointer to the audio/image stream points to the end of the story. If so, program control transfers back to the top level menu at step 202. If the end of the story is not reached, program control transfers back to step 211, which outputs the next packet of narrative data. Thus, the cycle contained in steps 211 through 216 repeats until an interrupt occurs or the story ends.

Steps 218 and 220 process interrupts. Step 218 determines whether the "explore" interrupt 700 occurs. If so, program control transfers to step 222, which activates story telling in exploration mode. If step 218 determines that the interrupt was not the "explore" interrupt 700, program control transfers to step 220, which processes all other interrupts. Here, the preferred embodiment recognizes five additional interrupts: (1) caption 702, (2) sidebar 704, (3) audio/image control 706, (4) library 708, and (5) bookmark 710.

Figure 8:
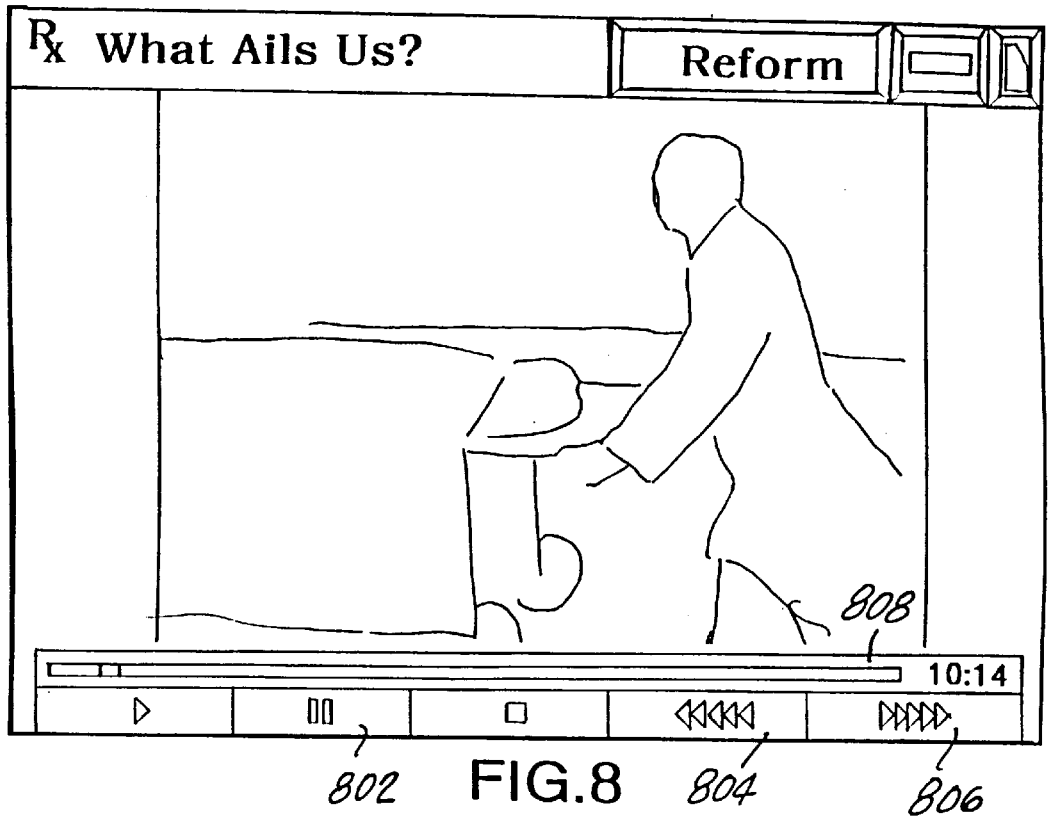
FIG. 8 shows a typical screen in the narrative mode, wherein the audio/image control features are selected.

The caption interrupt 702 shows the user a caption corresponding to the image currently displayed in narrative mode. The sidebar interrupt 704 transfers control to a text presentation (which may also include embedded images and hypertext links to additional multimedia data) providing detailed information on a particular point within the narrative presentation of the story. The audio/image control interrupt 706 permits the user to pause, rewind or advance the story as the user desires. FIG. 8 shows a representative screen from the narrative mode when audio/image control is active. The icons 800 retain their usual meanings with respect to operating an audio or video tape. Pause 802 allows the user to pause the story. Rewind 804 permits the user to rewind the story. Advance 806 permits the user to fast forward the story. To assist the user, a counter 808 indicates the remaining time in the narrative story. The library interrupt 708 permits the user to jump to the library. The library feature is discussed in its own flow diagram in FIG. 3. Finally, the bookmark interrupt 710 permits the user to place a bookmark within the story or elsewhere, permitting the user to mark a spot for future return. After executing the interrupt, program control transfers to step 214.

4. Relating a Story in Exploration Mode

Figure 9:
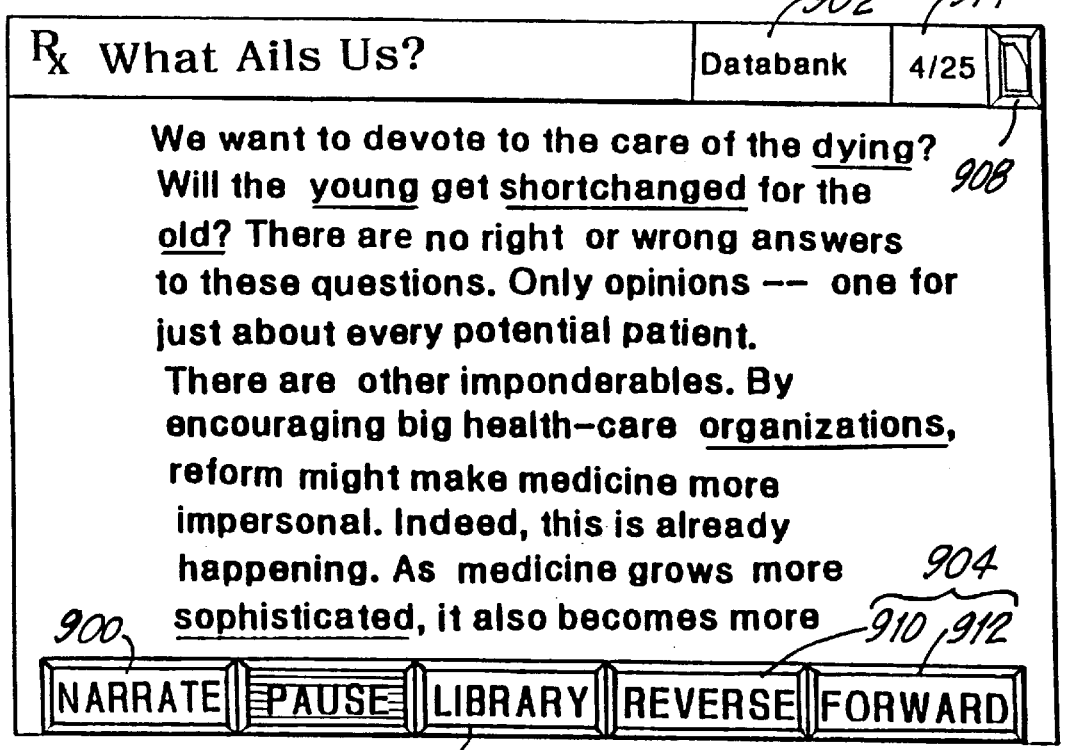
FIG. 9 shows a typical screen in the exploration mode.

Step 222 provides the entry point for exploration mode. This step writes to the output device 106 the current page of text pointed to by the text pointer. FIG. 9 shows a typical screen in exploration mode. In contrast to the narrative mode, automatic pointer advancement does not occur in exploration mode. Instead, step 224 loops to itself until it detects an interrupt. When it detects an interrupt, program control transfers to step 226 for evaluation of the interrupt. If the interrupt is a "narrate" interrupt 900, step 226 toggles the system to narrate mode by transferring program control to step 211. However, if an interrupt other than the narrate interrupt is detected, step 228 processes such interrupt. Here, the preferred embodiment recognizes four additional interrupts: (1) sidebar 902, (2) text control 904, (3) library 906, and (4) bookmark 908.

The sidebar interrupt 902 in exploration mode works like the sidebar interrupt 704 in narrative mode. However, in addition to pure sidebar topics, the user may access selected portions of the narrative story via the sidebar interrupt in exploration mode. The text control interrupt 904 is similar to the audio/image control interrupt in narrative mode 706. It differs slightly because of format. Reverse 910 permits the user to reverse the story one page. Forward 912 allows the user to advance the story one page. To assist the user, a counter 914 in the upper right corner indicates the current page and the total number of pages available in the exploration form of the story. Significantly, both the audio/image control interrupt 706 and the text control interrupt 904 each change both the audio/image and text pointers to ensure uniform location management and instantaneous toggling between modes. The library interrupt 906 permits the user to jump to the library. The library feature is discussed in its own flow diagram in FIG. 3. Finally, the bookmark interrupt 908 permits the user to place a bookmark within the story or elsewhere, permitting the user to mark a spot for future return. After executing the interrupt, program control returns to step 222.

5. The Library Feature

Figure 3:
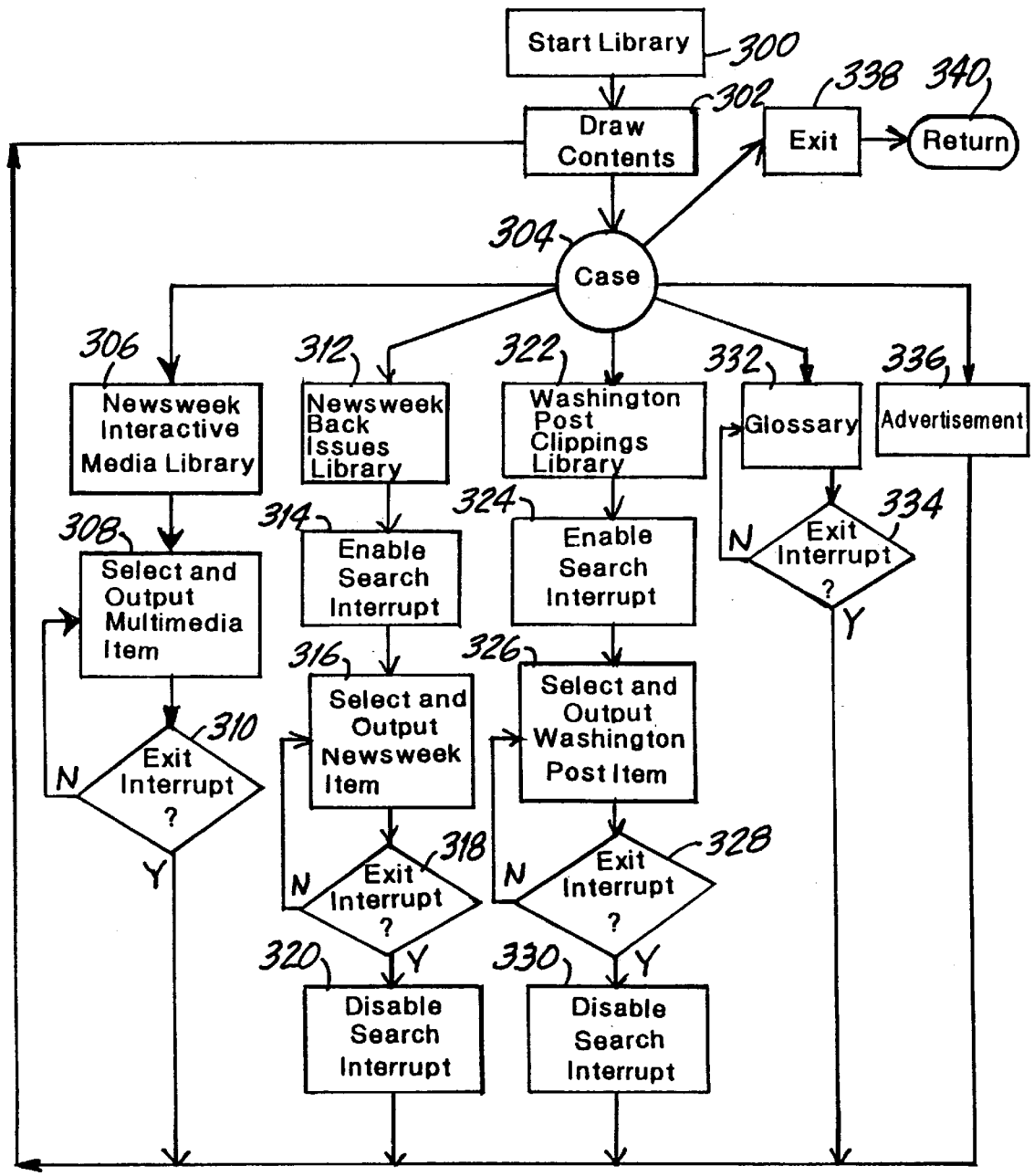
FIG. 3 shows a flow diagram of the library function within the process.
Figure 10:
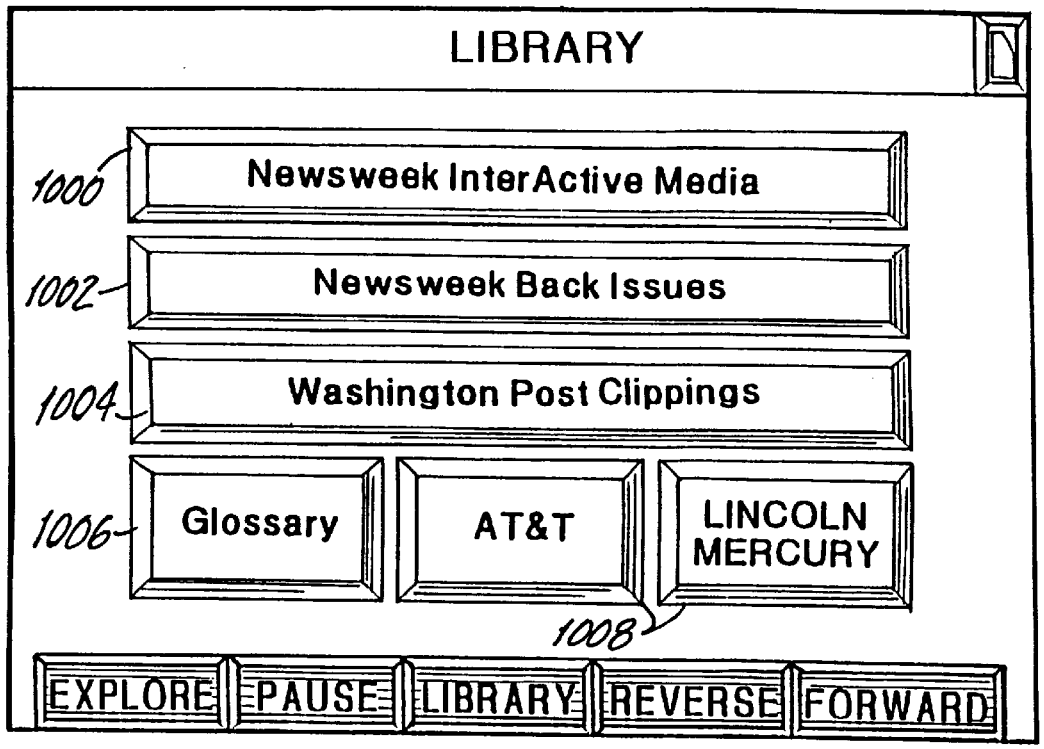
FIG. 10 shows the top level menu of the library feature.

FIG. 3 shows a flow diagram of the library feature of the system. The library permits quick access to audio, image and text data stored on the digital media element 100. Step 302 outputs the contents of the library to the output device 106. FIG. 10 shows the top level menu options supported in the library feature. In the preferred embodiment, the library supports five features: (1) the "Newsweek Interactive Media" library 1000, (2) the "Newsweek Back Issues" library 1002, (3) the "Washington Post Clippings" library 1004, (4) a glossary 1006, and (5) advertisements 1008. Step 304 recognizes which of the five functions is selected and transfers program control to step 306, 312, 322, 332, or 336, or the exit procedure at step 338.

Figure 11:
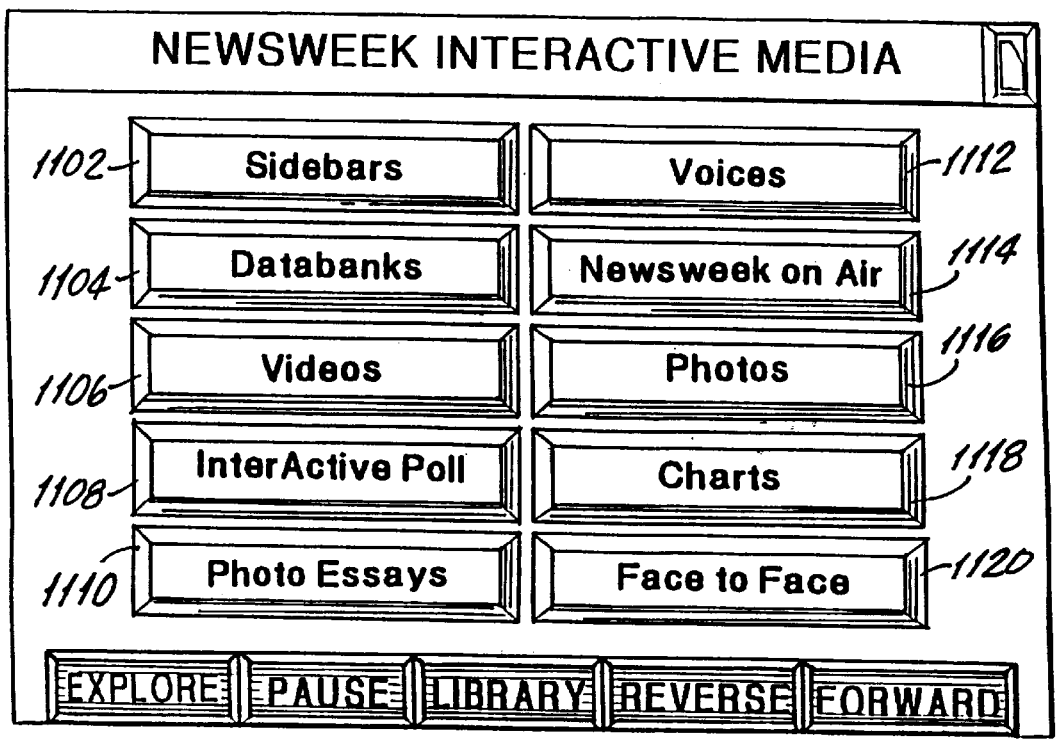
FIG. 11 shows the "Newsweek Interactive Media" menu within the library feature.
Figure 12:
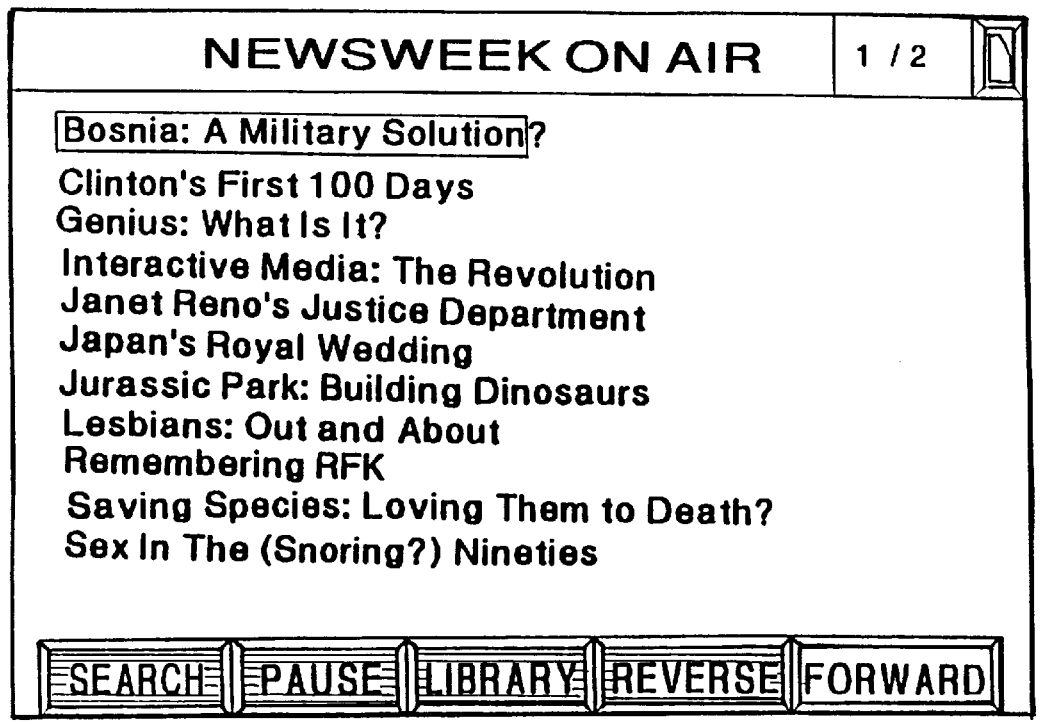
FIG. 12 shows a typical screen for selecting an item within the "Newsweek Interactive Media" section of the library.

Step 306 engages the "Newsweek Interactive Media" library 1000. Step 308 permits the selection and output of a multimedia item. It is. divided into three phases: (1) media selection, (2) item selection, and (3) item output. The first phase involves selecting a media format. FIG. 11 shows a typical menu for selecting media format. In the preferred embodiment, this library supports ten media formats: (1) sidebar 1102, which contains sidebar data; (2) databank 1104, which contains statistical data and charts; (3) video 1106, which contains synchronized audio/image data; (4) "Interactive Poll" 1108, which contains data from the "Interactive Poll" feature; (5) photoessay 1110, which contains sequenced image data; (6) voices 1112, which contains interview data; (7) "Newsweek on Air" 1114, which contains audio data; (8) photo 1116, which contains still images, (9) chart 1118, which contains statistical chart data; and (10) "Face-to-Face" 1120, which contains data from the "Face-to-Face" feature. The second phase involves selecting an item within a media format. FIG. 12 shows a typical menu for selecting items within the "Newsweek on Air" media format. The user selects an item by scrolling through a list of titles and clicking on the desired title. The final phase outputs the selected item to the output device 106.

During the selection of an item, step 310 recognizes exit interrupts. An exit interrupt closes the "Newsweek Interactive Media" library and transfers control to step 302. An exit interrupt occurs when the user inputs an exit command during the first phase of step 308, selecting a media format.

In contrast, the occurrence of an exit command in the second or third phases of step 308 does not terminate the library topic. The program continues with step 308 but control is bumped up one level, from the second phase to the first phase or from the third phase to the second phase.

Figure 13:
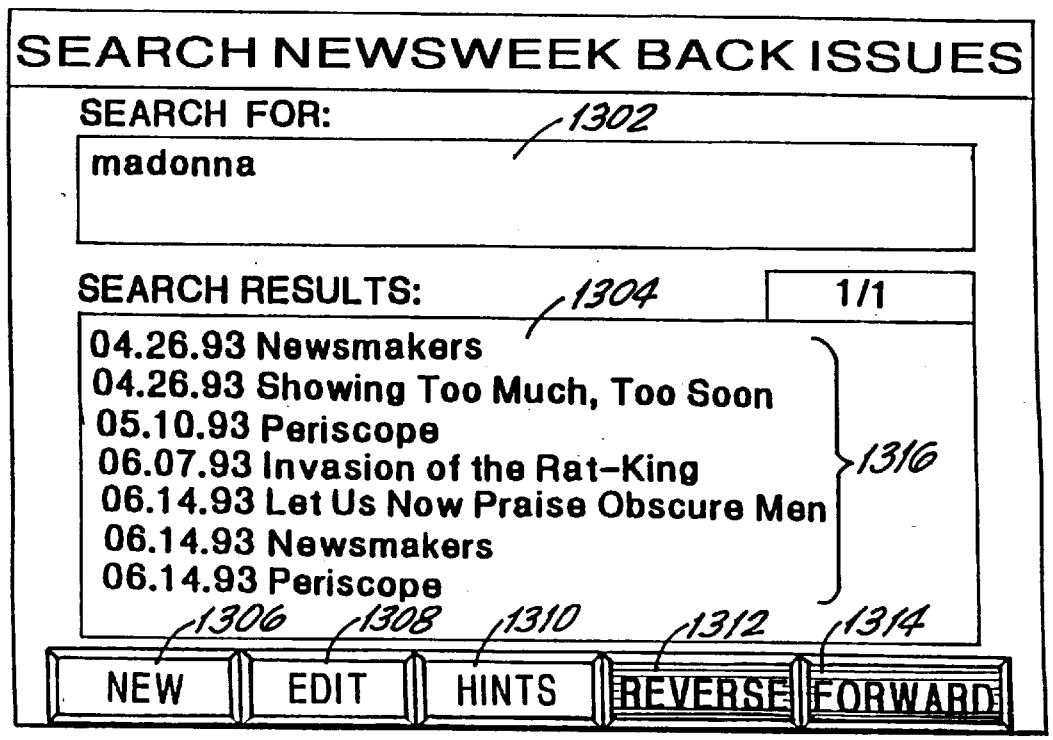
FIG. 13 shows the layout of the searching screen.

Step 312 engages the "Newsweek Back Issues" library 1002. Step 314 enables search interrupts. Here, a search interrupt permits the user to perform a text search of text information contained in the "Newsweek Back Issues" library 1002. FIG. 13 shows the layout of the searching screen. The search query 1302 permits the user to enter on the input device 104 the desired search results. After entry of the search query, the processing means 108 determines which articles satisfy the search query and outputs the titles of these articles as search results 1304. As with other library features, the user scrolls through these terms using the reverse button 1312 and the forward button 1314 and views a matching article 1316 by clicking on it. Features within the search interrupt permit the user to enter a new search 1306, edit an existing search query 1308, and review online help 1310.

Figure 14:
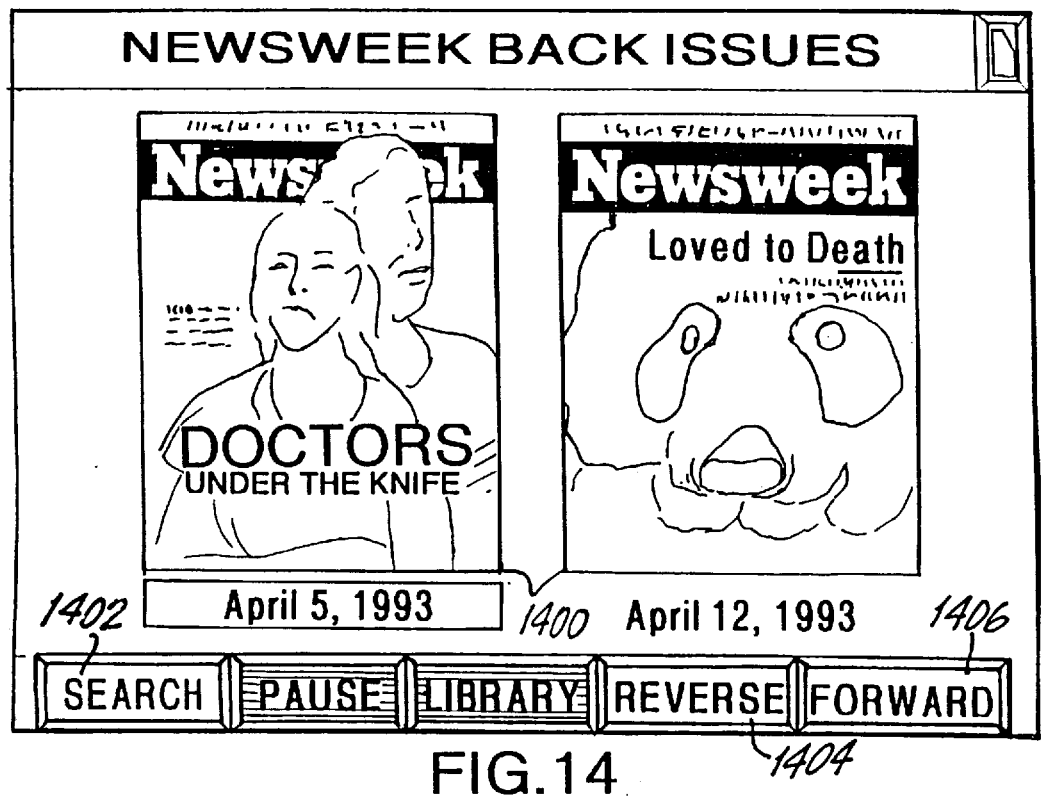
FIG. 14 shows the layout of the "Newsweek Back Issues" screen for selecting a magazine issue.
Figure 15:
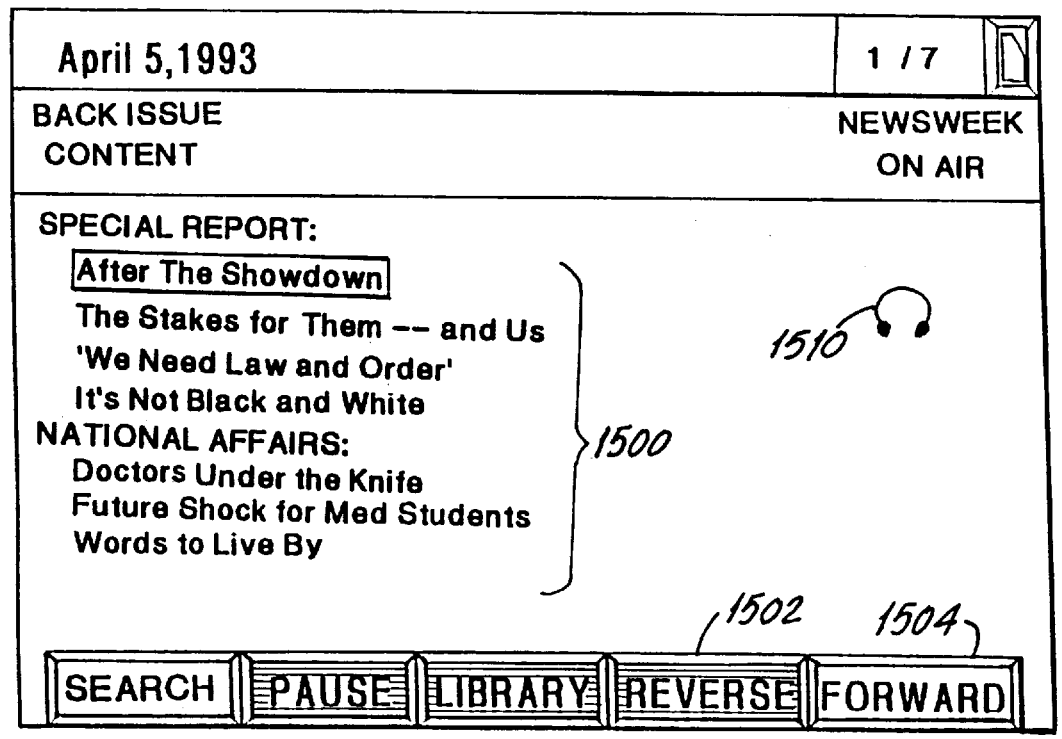
FIG. 15 shows the table of contents of a back issue of *Newsweek*.

Step 316 permits the selection and output of an item from the "Newsweek Back Issue" library. Step 316 consists of three phases analogous in operation to the three phases which comprise step 308. Here, the three phases include: (1) issue selection, (2) item selection, and (3) item output. With respect to the first phase, FIG. 14 shows the layout of the "Newsweek Back Issues" screen for selecting a magazine issue. The user selects an issue 1400 by clicking on it. Also, using the appropriate buttons, the user may scroll back 1404 and forward 1406 through pages of issues. FIG. 15 shows an item selection screen after an issue is selected. The user selects an item 1500 by clicking on it. Also, using the appropriate buttons, the user may scroll back 1502 or forward 1504 through pages of items. An audio "Newsweek on Air" segment is selected by clicking on the headphone icon 1510 next to the corresponding article name.

While in this library, the search function 1402 causes a search interrupt and step 318 processes exit interrupts. In the "Newsweek Back Issues" library, an exit interrupt transfers control back to step 302 (after first disabling search interrupts in step 320) only when an exit command occurs in the first phase of step 316, issue selection. An exit command from the second or third phase of step 316 merely bumps control from the second phase to the first phase or from the third phase to the second phase, respectively.

Figure 16:
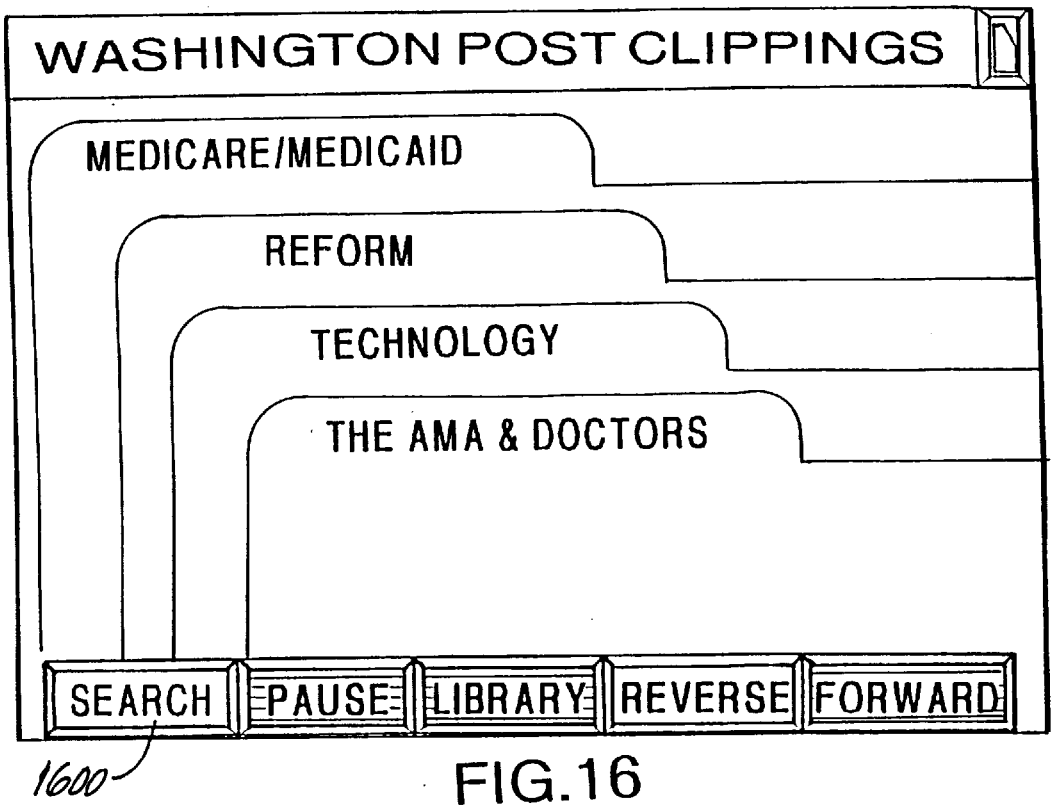
FIG. 16 shows a typical folder directory of clippings from the *Washington Post*.

Step 322 engages the "Washington Post Clippings" library 1004. Step 324 enables search interrupts, as discussed in step 314. The only difference is that here a search interrupt permits the user to perform a text search of text information contained in the "Washington Post Clippings" library 1004. Step 326 permits the selection and output of an item from the "Washington Post Clippings" library 1004. Step 326 consists of three phases analogous in operation to the three phases which comprise steps 308 and 316. Here, the three phases include: (1) folder selection, (2) article selection, and (3) article output. In contrast to the "Newsweek Back Issues" library, the "Washington Post Clippings" library is arranged in folders. The user selects a folder and subfolders as desired. FIG. 16 shows a typical folder directory. Once the user selects a folder, the user selects a particular article, as discussed in the selection of an item in step 316.

While in this library, the search function 1600 causes a search interrupt and step 328 processes exit interrupts. In the "Washington Post Clippings" library, an exit interrupt transfers control back to step 302 (after first disabling search interrupts in step 330) only when an exit command occurs in the first phase of step 326, folder selection. An exit command from the second or third phase of step 326 merely bumps control from the second phase to the first phase or from the third phase to the second phase, respectively.

The glossary function 332 allows the user to select a particular glossary term related to a story contained on the digital media element 100. As in other contexts, the glossary allows the user to scroll through items and select a term of interest. After selecting a term of interest, its definition is given. Program control returns to step 302 after step 334 detects an exit interrupt.

Step 336 engages a selected advertisement. The system presents audio/image promotional material from one of the sponsors of the digital media element 100. The advertisements in multimedia form resemble television advertisements, although they may also add elements of user control, such as forward, reverse and the selection of hypertext information. At the conclusion of the advertisement, program control returns to step 302.

Step 338 recognizes an exit command and returns program control to the calling function in step 340. Based on the call to the library, program control returns to the top level menu at step 208, the interrupt process in narrative mode at step 220 or the interrupt process in exploration mode at step 228.

6. The Interactive Poll Feature

Figure 4:
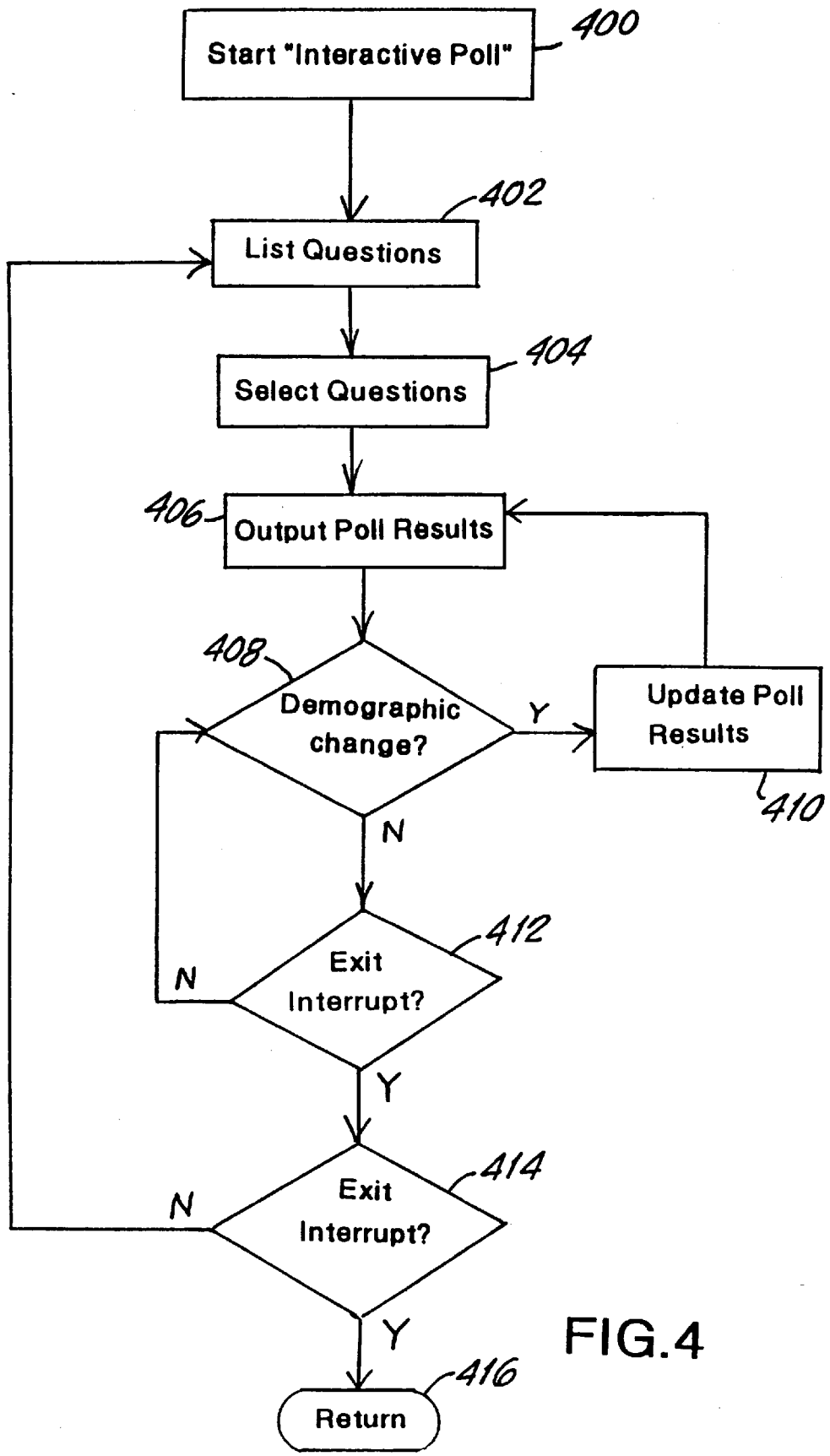
FIG. 4 shows a flow diagram of the "Interactive Poll" feature of the process.

FIG. 4 shows a flow diagram of the "Interactive Poll" feature of the process, and FIG. 17 shows a representative screen from this feature. The "Interactive Poll" feature permits a user to actively assemble poll information based on various demographic classifications and to create graphic representations of the information. The process starts with a default demographic reflecting the general population 1700. Step 402 lists the questions for which results are stored on the digital media element 100. Step 404 permits the user to select a question. Step 406 outputs the poll results pertaining to the selected question and selected demographic. Step 408 permits the user to change the demographic represented in the poll sample to reflect race 1702, gender 1704, party affiliation 1706, income bracket 1708, or to return to the default general sample 1700.

If a demographic change occurs in step 408, program control transfers to step 410. In step 410, the poll results are updated to reflect the new demographic selection and the poll results are redrawn in step 406. If a demographic change is not detected in step 408, program control transfers to step 412, which tests for an exit interrupt. If an exit interrupt is not recognized, program control returns to step 408, permitting the user to further change the demographic complexion of the poll sample and output poll results. If an exit interrupt occurs, program control continues with step 414, which again tests for an exit interrupt. If an exit interrupt is not recognized, program control returns to step 402 to allow the user to select a further question for review. If an exit interrupt occurs, program control returns to the calling process in step 416. Based on the call to the "Interactive Poll" feature, program control returns to the top level menu at step 208, the interrupt process in narrative mode at step 220 or the interrupt process in exploration mode at step 228.

7. The Face-to-Face Feature

Figure 5:
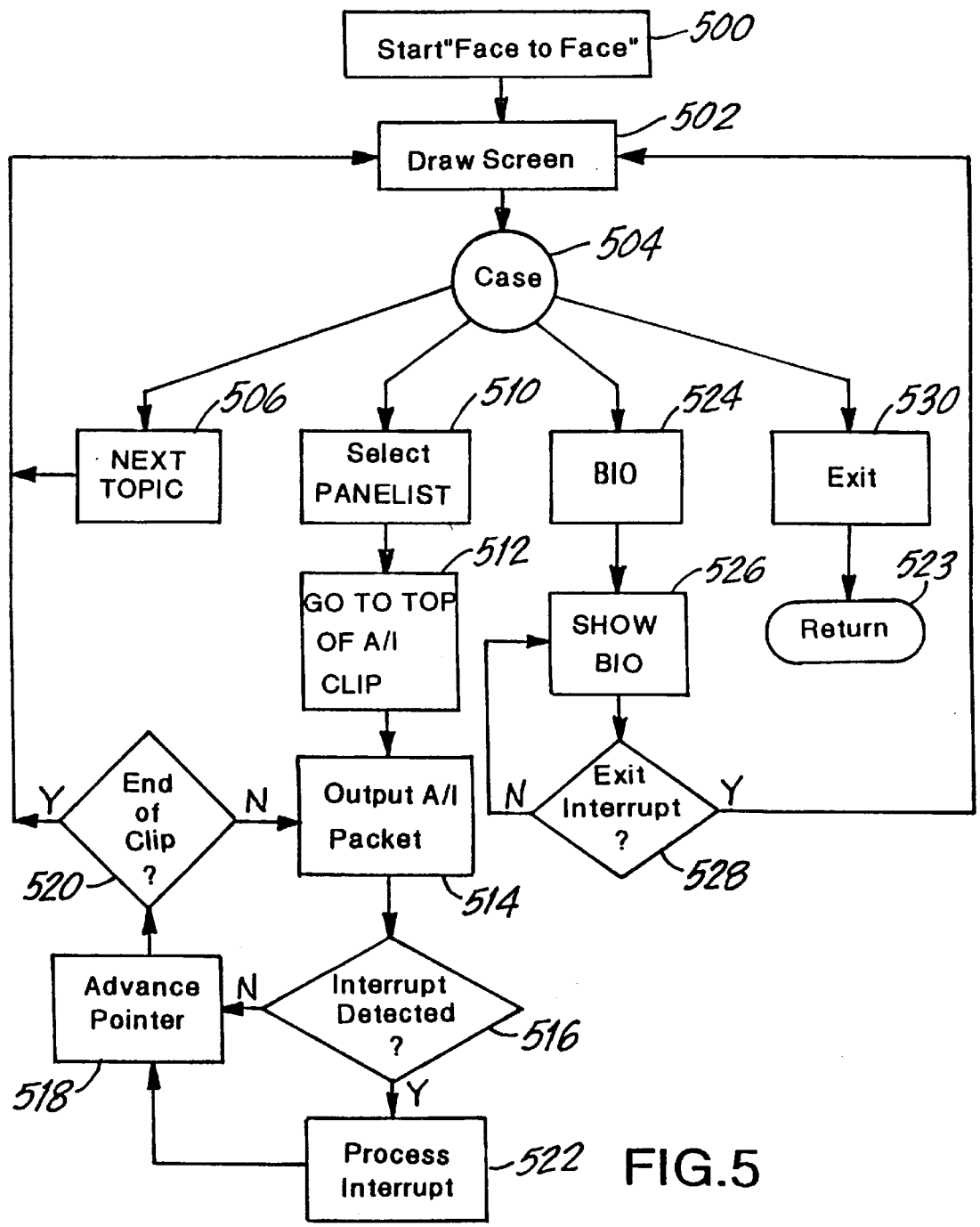
FIG. 5 shows a flow diagram of the "Face-to-Face" feature of the process.

FIG. 5 shows a flow diagram of the "Face-to-Face" feature of the process, and FIG. 18 shows a representative screen from this feature. Step 502 begins the process by drawing the screen shown in FIG. 18, which includes means for selecting the next topic 1800, selecting a particular speaker 1802, and providing biographical information about a selected speaker 1804. Based on the user's selection, step 504 transfers program control to step 506, 510, or 524, or the exit procedure at step 530.

If the next topic button is selected, program control transfers to step 506. Step 506 reads the next question from the digital media element 100, returning to the first question in the list if the end of the list is reached. Step 506 returns program control to step 502.

Step 510 recognizes when a speaker is selected and engages the video clip of the speaker at step 512. Step 512 sets an audio/image pointer to the beginning of the selected speaker's response to the selected question. Step 514 sends the currently pointed to packet of audio/image data to the output device 106. Step 516 tests for an interrupt.

If an interrupt is detected, program control transfers to step 522 for processing. Here, the preferred embodiment recognizes two interrupts: (1) "Bio" 1804 and (2) audio/image control 1806. The "Bio" interrupt 1804 is discussed below and the audio/image interrupt 1806 is identical to the one discussed previously, audio/image interrupt 706. If an interrupt is not detected in step 516 or following execution of the interrupt, program control transfers to step 518. Step 518 advances the video clip by advancing the pointer to the audio/image stream to the next packet of data in the stream. Step 520 determines whether the pointer to the audio/image stream points to the end of the video clip. If not, program control loops to step 514, which outputs the next packet of audio/image data in a continuing cycle. If the end of the video clip is reached, program control returns to step 502. The user may then select a new question or a different panelist.

Step 524 permits the user to obtain a biographical description of a selected speaker. Step 526 shows the biographic information and step 528 pauses until the user sends an exit interrupt to the system. Once the user signals the process to continue through an exit interrupt, program control returns to step 502.

If the user seeks to exit the "Face-to-Face" feature, an exit interrupt is sent at step 504, which returns program control to the calling process through steps 530 and 532. Based on the call to the "Face-to-Face" feature, program control returns to the top level menu at step 208, the interrupt process in narrative mode at step 220 or the interrupt process in exploration mode at step 228.

In this way, the present invention provides a means for presenting a multimedia story using a bimodal spine. Although the invention has been shown and described in terms of a preferred embodiment, those persons skilled in the art will recognize that modifications to the preferred embodiment may be made without departing from the spirit of the invention as claimed below.

We claim:

1. A multimedia system for a bimodal presentation of a story comprising:

digital storage means for storing data comprising the story in a first mode and in a second mode such that the data of the first mode consists essentially of synchronized audio data and image data and the data of the second mode consists essentially of text data, wherein the audio data comprises a script of the story in spoken form and the text data consists essentially of said script in written form;

retrieval means for accessing the data in the digital storage means;

output means for presenting the story to a user in a narrative mode such that the data of the first mode is presented to the user in substantially an automatic fashion, and alternatively in an exploration mode such that the data of the second mode is presented to the user in substantially an interactive fashion;

input means for permitting a user to interact with and control the system so that, in an exploration mode, the user is permitted to move both forward and backward through said script presented in the exploration mode;

switching means for allowing the user to instantaneously switch between presentation of the story in the narrative mode and presentation of the story in the exploration mode; and processing means, coupled to said switching means, for maintaining narrative continuity of said script presented in said narrative mode with said script presented in said exploration mode, whereby, when the user switches from the narrative mode to the eploration mode, the script is presented in the exploration mode from the point in the script where switch occurred, and, when the user switches from the exploration mode to the narrative mode, the script is presented in the narrative mode from the point in the script where the switch occurred.

2. The multimedia system of claim 1 further comprising a library means for permitting the user to directly access selected data from the digital storage means.

3. The multimedia system of claim 1 further comprising an interactive poll means for permitting the user to interactively assemble poll information based on demographic classifications and to create graphical representations of the poll information.

4. The multimedia system of claim 1 further comprising a face-to-face feature means for permitting the user to actively conduct an interview by selecting questions and selecting panelists to respond to the questions.

5. The multimedia system of claim 1 wherein the data in the digital storage means is stored remotely and is communicated for presentation to the user by electronic digital communication means.

6. The multimedia system of claim 1 wherein the data comprising the story further comprises hypertext data and wherein the processing means allows the user to access the hypertext data from the narrative mode and the exploration mode.

7. A multimedia system for a bimodal presentation of a story comprising:

digital storage means for storing data comprising the story in a first mode and in a second mode such that the data of the first mode consists essentially of synchronized audio data and image data and the data of the second mode consists essentially text data and image data, wherein the audio data comprises a script of the story in spoken form and the text data consists essentially of said script in written form;

retrieval means for accessing the data in the digital storage means;

output means for presenting the story to a user in a narrative mode such that the data of the first mode is presented to the user in substantially an automatic fashion, and alternatively in an exploration mode such that the data of the second mode is presented to the user in substantially an interactive fashion;

input means for permitting a user to interact with and control the system so that, in an exploration mode, the user is permitted to move both forward and backward through said script presented in the exploration mode switching means for allowing the user to instantaneously switch between presentation of the story in the narrative mode and presentation of the story in the exploration mode; and processing means, coupled to said switching means, for maintaining narrative continuity of said script presented in said narrative mode with said script presented in said exploration mode, whereby, when the user switches from the narrative mode to the exploration mode, the script is presented in the exploration mode from the point in the script where the switch occurred, and, when the user switches from the exploration mode to the narrative mode, the script is presented in the narrative mode from the point in the script where the switch occurred.

8. The multimedia system of claim 7 further comprising a library means for permitting the user to directly access selected data from the digital storage means.

9. The multimedia system of claim 7 further comprising an interactive poll means for permitting the user to interactively assemble poll information based on demographic classifications and to create graphical representations of the poll information.

10. The multimedia system of claim 7 further comprising a face-to-face feature means for permitting the user to actively conduct an interview by selecting questions and selecting panelists to respond to the questions.

11. The multimedia system of claim 7 wherein the data in the digital storage means is stored remotely and is communicated for presentation to the user by electronic digital communication means.

12. The multimedia system of claim 7 wherein the data comprising the story further comprises hypertext data and wherein the processing means allows the user to access the hypertext data from the narrative mode and the exploration mode.

13. A method for bimodal multimedia presentation of a story comprising the steps of:

storing data comprising the story in a first mode and in a second mode such that the data of the first mode consists essentially of synchronized audio data and image data and the data of the second mode consists essentially of text data, wherein the audio data comprises a script of the story in spoken form and the text data consists essentially of said script in written form;

accessing the data in the first mode and the second mode;

presenting the story to a user in a narrative mode such that the data of the first mode is presented to the user in substantially an automatic fashion, and alternatively in an exploration mode such that the data of the second mode is presented to the user in substantially an interactive fashion;

permitting a user to interact with and control the system so that, in an exploration modes the user is permitted to move both forward and backward through said script presented in the exploration mode; and allowing the user to instantaneously switch between presentation of the story in the narrative mode and presentation of the story in the exploration mode such that the story maintains narrative continuity in said script presented in said narrative mode with said script presented in said exploration mode, whereby, when the user switches from the narrative mode to the exploration mode. the script is presented in the exploration mode from the point in the script where the switch occurred, and, when the user switches from the exploration mode to the narrative mode, the script is presented in the narrative mode from the point in the script where the switch occurred.

14. The method of claim 13 further comprising the step of permitting the user to directly access selected data.

15. The method of claim 13 further comprising the step of permitting the user to interactively assemble poll information based on demographic classifications and to create graphical representations of the poll information.

16. The method of claim 13 further comprising the step of permitting the user to actively conduct an interview by selecting questions and selecting panelists to respond to the questions.

17. The method of claim 13 further comprising the step of storing the data remotely and communicating the data for presentation to the user by electronic digital communication means.

18. The method of claim 13 wherein the data comprising the story further comprises hypertext data and wherein the user accesses the hypertext data from the narrative mode and the exploration mode.

19. A method for bimodal multimedia presentation of a story comprising the steps of:

storing data comprising the story in a first mode and in a second mode such that the data of the first mode consists essentially of synchronized audio data and image data and the data of the second mode consists essentially of text data and image data, wherein the audio data comprises a script of the story in spoken form and the text data consists essentially of said script in written form;

accessing the data in the first mode and the second mode;

presenting the story to a user in a narrative mode such that the data of the first mode is presented to the user in substantially an automatic fashion, and alternatively in an exploration mode such that the data of the second mode is presented to the user in substantially an interactive fashion;

permitting a user to interact with and control the system so that, in an exploration mode, the user is permitted toc move both forward and backward through said script presented in the exploration mode; and allowing the user to instantaneously switch between presentation of the story in the narrative mode and presentation of the story in the exploration mode such that the story maintains narrative continuity in said script presented in said narrative mode with said script presented in said exploration mode, whereby, when the user switches from the narrative mode to the exploration mode, the script is presented in the exploration mode from the point in the script where the switch occurred and, when the user switches from the exploration mode to the narrative mode, the script is presented in the narrative mode from the point in the script where the switch occurred.

20. The method of claim 19 further comprising the step of permitting the user to directly access selected data.

21. The method of claim 19 further comprising the step of permitting the user to interactively assemble poll information based on demographic classifications and to create graphical representations of the poll information.

22. The method of claim 19 further comprising the step of permitting the user to actively conduct an interview by selecting questions and selecting panelists to respond to the questions.

23. The method of claim 19 further comprising the step of storing the data remotely and communicating the data for presentation to the user by electronic digital communication means.

24. The method of claim 19 wherein the data comprising the story further comprises hypertext data and wherein the user accesses the hypertext data from the narrative mode and the exploration mode.

* * * * *